(12) United States Patent
Takeuchi

(10) Patent No.: US 9,420,167 B2
(45) Date of Patent: Aug. 16, 2016

(54) IMAGING APPARATUS

(75) Inventor: Hiroshi Takeuchi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 172 days.

(21) Appl. No.: 13/166,404

(22) Filed: Jun. 22, 2011

(65) Prior Publication Data

US 2011/0317059 A1    Dec. 29, 2011

(30) Foreign Application Priority Data

Jun. 23, 2010 (JP) ................................. 2010-142656

(51) Int. Cl.
| | |
|---|---|
| H04N 5/232 | (2006.01) |
| H04N 5/262 | (2006.01) |
| G06K 9/00 | (2006.01) |
| G02B 7/08 | (2006.01) |
| G03B 13/36 | (2006.01) |
| G03B 19/12 | (2006.01) |

(52) U.S. Cl.
CPC .............. *H04N 5/23219* (2013.01); *G02B 7/08* (2013.01); *G03B 13/36* (2013.01); *G03B 19/12* (2013.01); *H04N 5/23212* (2013.01)

(58) Field of Classification Search
USPC ......... 348/240.1, 240.3, 240.99, 333.01, 345, 348/347, 352, 353; 382/103
See application file for complete search history.

(56) References Cited

U.S. PATENT DOCUMENTS

| | | | | |
|---|---|---|---|---|
| 2008/0246852 | A1* | 10/2008 | Mori ........................... | 348/222.1 |
| 2009/0009606 | A1 | 1/2009 | Takeuchi | |
| 2009/0059021 | A1* | 3/2009 | Rimon et al. .............. | 348/222.1 |
| 2009/0135291 | A1* | 5/2009 | Sugimoto ..................... | 348/347 |
| 2009/0252374 | A1* | 10/2009 | Ishikawa ............... | G06T 7/2033 382/103 |
| 2009/0304234 | A1* | 12/2009 | Kondo et al. .................. | 382/103 |
| 2011/0002680 | A1* | 1/2011 | Narasimha et al. ........... | 396/124 |

FOREIGN PATENT DOCUMENTS

| | | |
|---|---|---|
| JP | A-03-204783 | 9/1991 |
| JP | A-10-255057 | 9/1998 |
| JP | A-2006-065399 | 3/2006 |
| JP | A-2006-227973 | 8/2006 |
| JP | A-2007-272732 | 10/2007 |

OTHER PUBLICATIONS

May 15, 2012 Notice of Allowance issued in Japanese Patent Application No. 2010-142656 (with translation).
May 29, 2015 Office Action isseud in Chinese Patent Application No. 201110173983.5.

* cited by examiner

*Primary Examiner* — Trung Diep
(74) *Attorney, Agent, or Firm* — Oliff PLC

(57) ABSTRACT

An imaging apparatus includes an optical system; an imaging unit; an extractor that extracts a part of a first image as a reference image, the first image being received via the imaging unit; a first detector that obtains a first similar image from within the first image, the first similar image having a characteristic similar to a characteristic of the reference image; a calculator that obtains a positional relationship between the first similar image and the reference image; a second detector that obtains a second similar image from within a second image, the second image being received via the imaging unit later than the first image, the second similar image having a characteristic similar to the characteristic of the reference image; and a position detector that detects a position of a corresponding part of the second similar image in accordance with the positional relationship.

33 Claims, 7 Drawing Sheets

51 RECTANGULAR FRAMES INDICATE FOCUS POINTS

IMAGING APPARATUS

CROSS-REFERENCE TO RELATED APPLICATION

Priority is claimed on Japanese Patent Application No. 2010-142656 filed on Jun. 23, 2010, the contents of which are incorporated herein by reference.

BACKGROUND

1. Field of the Invention

The invention relates to an imaging apparatus.

2. Description of Related Art

In the related art, a technique of retrieving a region in an image acquired continuously over time, which has characteristic information similar to characteristic information of a subject selected first to thereby track the position of the subject, is known. For example, Japanese Patent Application Publication No. 2007-272732A discloses a technique which adds a positional correction input from a user to the tracking position of a subject while performing the tracking of the subject.

According to the technique, when a plurality of regions having the characteristic Information similar to the characteristic information of the subject selected first is included in the retrieval target image acquired later, an imaging apparatus may extract a plurality of similar regions from the image as tracking positions. Thus, it may be difficult to determine one tracking position, and there is a problem in that a plurality of tracking positions may be displayed alternately.

A situation when a concrete problem occurs will be described with reference to FIGS. 6A and 6B. A case where a train having a uniformly colored front is coming towards a viewer will be described as an example. A photographer selects a focus point on which the photographer wants to focus in advance from a plurality of rectangular regions (called focus points) displayed on a finder screen as shown in FIG. 7 and stores the information thereof in a RAM of an imaging apparatus. Then, the imaging apparatus can continuously focus on a moving subject by focusing on a subject imaged at the selected focus point.

The photographer adjusts the position of a predetermined focus point on a screen while looking at the finder so as to match a position below the front window of the train which is the location of a subject being tracked first. When the two positions match each other, the photographer half-presses a shutter button. While the shutter button is being half-pressed, the imaging apparatus automatically changes the focus point and continuously performs focusing following the movement of the subject.

The imaging apparatus stores image characteristic information (for example, color information) as a template within an initial focus detection position $82a$ depicted by a bold frame in FIG. 6A. The color within the bold frame is divided into 3-by-3 blocks, and the averages of the R, G, and B values within the respective blocks are used as the color information. That is, the image characteristic information within the initial focus detection position $82a$ is expressed as 27 kinds of data (R11, G11, B11) to (R33, G33, B33), for example. The imaging apparatus calculates and tracks a portion similar to the stored template information in the next tracking image.

SUMMARY

However, when the tracking position is calculated just by extracting a region most similar to the template information through template matching calculation, the region similar to the template information increases in size since the area of the front surface of the train having the same color increases as the train comes closer to the photographer. In this case, since the most similar position changes depending on subtle differences such as the way the light strikes or the like, there is a problem in that the tracking position $82b$ circles around within the position where the front surface of the train has a similar color. Thus, the user may feel that the tracking device is not operating stably.

A purpose of aspects of the present invention is to provide an imaging apparatus capable of calculating a tracking position stably.

According to an aspect of the invention, an imaging apparatus is provided, the imaging apparatus including an optical system; an imaging unit; an extractor that extracts a part of a first image as a reference image, the first image being received via the imaging unit; a first detector that obtains a first similar image from within the first image, the first similar image having a characteristic similar to a characteristic of the reference image; a calculator that obtains a positional relationship between the first similar image and the reference image; a second detector that obtains a second similar image from within a second image, the second image being received via the imaging unit later than the first image, the second similar image having a characteristic similar to the characteristic of the reference image; and a position detector that detects a position of a corresponding part of the second similar image in accordance with the positional relationship.

According to aspects of the present invention, it is possible to calculate the tracking position stably.

DESCRIPTION OF EMBODIMENTS

Figure 1:
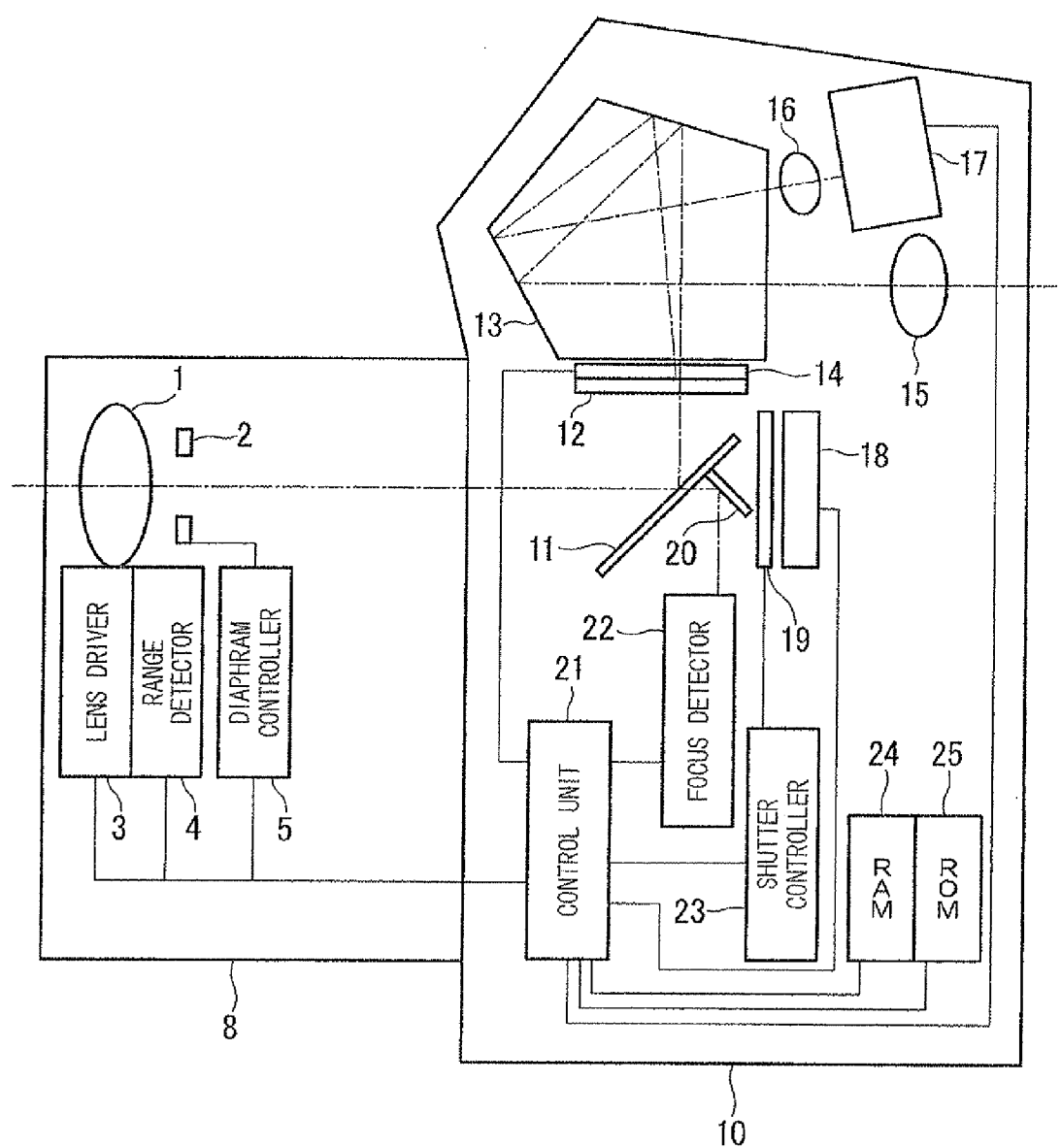
FIG. 1 is a configuration diagram showing a major part of a digital single-lens reflex camera according to an embodiment of the invention.

Hereinafter, an embodiment of the invention will be described with reference to the drawings. FIG. 1 is a configuration diagram of a major part of a digital single-lens reflex camera according to an embodiment of the invention. In FIG. 1, a replacement lens 8 is attached to a camera body 10. The replacement lens 8 is detachably attached to the camera body 10.

The camera body 10 includes a quick return mirror 11, a focusing glass 12, a pentagonal prism 13, a display 14, an ocular lens 15, a photometer lens 16, a sub-image sensor (imaging unit) 17, an imaging device 18, a shutter 19, a sub-mirror 20, a control unit 21, a focus detector 22, a shutter controller 23, a RAM 24, and a ROM 25.

The replacement lens 8 includes a photographic lens 1, a diaphragm 2, a lens driver 3, a range detector 4, and a diaphragm controller 5.

The range detector 4 detects a signal indicating a movement distance of a focus adjustment lens included in the photographic lens 1 using a detection signal detected by a detection device (not shown). When the focus adjustment lens moves to a focus position, a sharp image of a major subject is formed on the imaging device 18 and the sub-image sensor (imaging unit) 17 which are disposed on the camera body 10.

A subject beam entering the camera body 10 after passing through the photographic lens 1 and the diaphragm 2 is reflected upward by the quick return mirror 11 at the illustrated position and imaged on the focusing glass 12 before a release switch is full-pressed. The subject beam is then incident on the pentagonal prism 13. The incident subject beam is refracted by the pentagonal prism 13 and imaged again on the ocular lens 15. Moreover, the subject beam is split by the pentagonal prism 13, and the split subject beam is incident on the photometer lens 16. The beam incident on the photometer lens 16 is incident on the sub-image sensor (imaging unit) 17, and the subject image is formed on the sensor.

The display unit 14 is also called a finder screen and has a configuration in which a PN liquid crystal layer is stacked on the focusing glass. The display unit 14 displays a focus point.

The photometer lens 16 includes an image sensor (for example, a CCD image sensor) which has a plurality of photoelectric conversion elements corresponding to pixels. The sub-image sensor (imaging unit) 17 images the subject image formed on the sensor and outputs a photoelectric conversion signal corresponding to the brightness of the subject image to the control unit 21.

Moreover, part of the subject beam passes through the quick return mirror 11 and is guided downward to the focus detector 22 by the sub-mirror 20. The focus detector 22 has an image sensor (for example, a CCD image sensor) for detecting the amount of defocus by a phase-difference detection method. The defocus amount detection image sensor images the subject image formed on the image sensor and outputs an analog photoelectric conversion signal corresponding to the brightness of the subject image to the control unit 21.

The quick return mirror 11 rotates to be outside the optical path when the release switch is full-pressed. Then, the subject beam entering the camera body is incident on the photographic imaging device 18 through the shutter 19, and the subject image is formed on the imaging surface thereof.

The imaging device 18 is configured by a photographic image sensor (for example, a CCD image sensor) which has a plurality of photoelectric conversion elements corresponding to pixels. The imaging device 18 images the subject image formed on the imaging surface and outputs a photoelectric conversion signal corresponding to the brightness of the subject image to the control unit 21.

Figure 2:
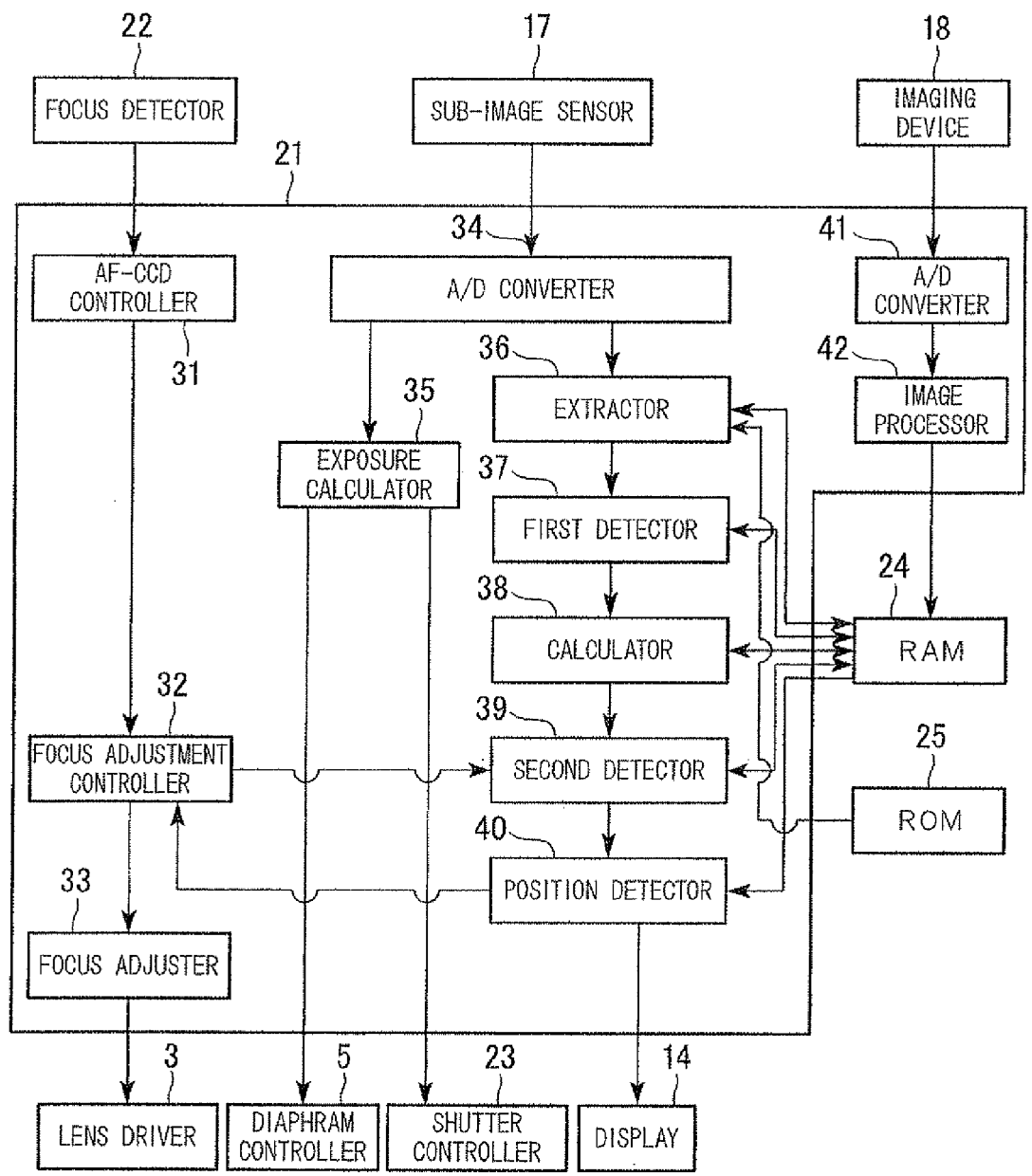
FIG. 2 is a block configuration diagram of a control unit.

Next, the flow of the processes by the control unit 21 will be described with reference to the block diagram of the control unit 21 in FIG. 2. The control unit 21 includes an AF-CCD controller 31, a focus adjustment controller 32, a focus adjuster 33, an A/D converter 34, an exposure calculator 35, an extractor 36, a first detector 37, a calculator 38, a second detector 39, a position detector 40, an A/D converter 41, and an image processor 42.

The AF-CCD controller 31 reads the photoelectric conversion signal (stored charge) from the focus detector 22. Moreover, the AF-CCD controller 31 performs A/D conversion on the read photoelectric conversion signal and supplies the A/D converted signal to the focus adjustment controller 32.

The focus adjustment controller 32 performs AF calculation on the tracking position supplied from the position detector 40 based on the analog photoelectric conversion signal input from the focus detector 22 to the calculated amount of defocus described later and outputs the calculated amount of defocus to the focus adjustor 33.

Specifically, the focus adjustment controller 32 calculates the amount of relative positional (positional relationship) shift (hereinafter referred to as amount of defocus) of two images which are formed at different positions on the sensor and which are formed by a pair of defocus amount detection beams incident through different areas of the photographic lens 1. The pair of subject images are close to each other in a front-focus state in which the photographic lens 1 forms the sharp image of the subject in front of an intended focal plane. The pair of subject images are separated from each other in a back-focus state in which the photographic lens 1 forms the sharp image of the subject to the back of the intended focal plane. No relative positional shift occurs in the pair of subject images in an in-focus state in which the sharp image of the subject is formed on the intended focal plane.

The focus adjustor 33 calculates a lens driving amount based on the focus state (amount of defocus) detected by the focus adjustment controller 32 with respect to the tracking position calculated by the position detector 40 and outputs the calculated lens driving amount to the lens driver 3. Upon receiving the lens driving amount from the focus adjustor 33, the lens driver 3 moves the position of the photographic lens 1 in accordance with the lens driving amount. In this way, the focusing of the lens can be adjusted.

The A/D converter 34 converts the analog photoelectric conversion signal input from the sub-image sensor (imaging unit) 17 into a digital signal and outputs the photoelectric conversion information to an exposure calculator 35 and an extractor 36.

The exposure calculator 35 performs a predetermined exposure calculation based on the input photoelectric conversion information to determine the aperture value of the diaphragm 2 and the shutter speed of the shutter 19. Then, the exposure calculator 35 outputs the aperture value to the diaphragm controller 5 so as to change the aperture value of the diaphragm 2. Moreover, the exposure calculator 35 outputs the shutter speed to the shutter controller 23 so as to open and close the shutter 19 at the shutter speed.

Figure 3A:
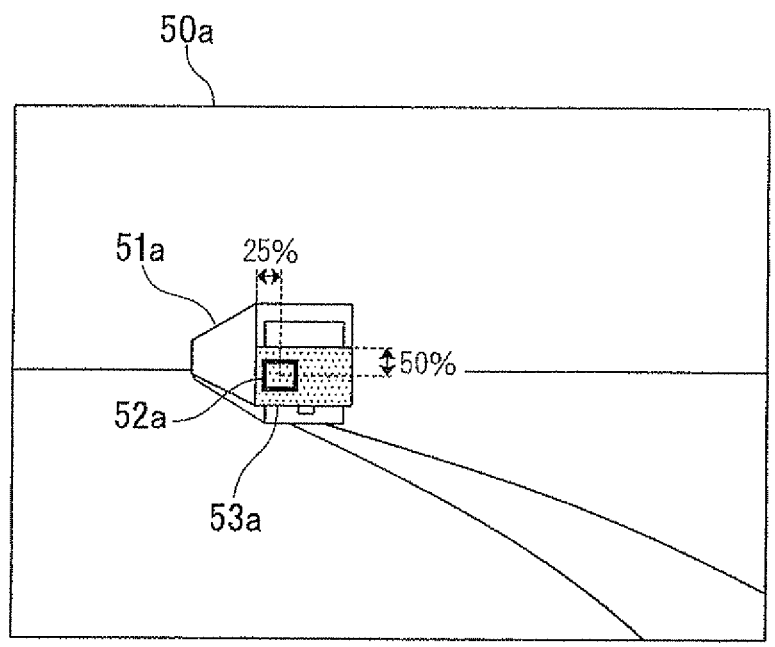
FIGS. 3A and 3B are diagrams illustrating a case in which one tracking position is determined when a train is coming toward a viewer according to an embodiment of the invention.

The extractor 36 reads a preset focus point from the RAM 24 and determines an initial focus detection position 52a shown in FIG. 3A based on the photoelectric conversion information of the sub-image sensor (imaging unit) input from the A/D converter 34. The extractor 36 stores the image information of the initial focus detection position 52a as image information for template matching.

In the present embodiment, color information is used as image information. Specifically, the extractor 36 divides the color within the bold frame of the focus detection position 52a shown in FIG. 3A into 3-by-3 blocks and stores the average of the R, G, and B values within the respective blocks in the RAM 24.

In addition, the luminance information of the image and information on designs such as edges may be used as the image information.

The first detector 37 performs a computation corresponding to template matching with respect to the entire image of which the template is acquired and calculates the similarity to the template at various positions with respect to all regions of the image while shifting the bold frame by a distance of one block. The first detector 37 calculates the similarity S to the template by summing the absolute values of the differences between the (Rij, Gij, Bij) values (i and j are integers from 1 to 3) at the respective positions and the (Rt, Gt, Bt) values, and the similarity S is expressed by Expression (1) below.

$$S = \sum_{i=1, j=1}^{i=3, j=3} ((R_{ij} - R_t) + (G_{ij} - G_t) + (B_{ij} - B_t))$$ Expression 1

The first detector 37 calculates a region similar to the template in the image of which the template is acquired. In the following description, the distribution of similarities S at respective positions will be referred to as a similarity map. The first detector 37 sorts the values of the similarity map in ascending order. In this case, since the absolute sum of the differences is calculated in the same image as the image of which the template is acquired, the smallest value of the similarity S is 0 at the position where the template is acquired.

The first detector 37 creates a binarized similarity map in which the value in each block of the similarity map is binarized. That is, 1 is assigned to a region in which the value of the similarity map is smaller than a predetermined threshold and 0 is assigned to the other regions. Moreover, the first detector 37 calculates a binarized similar region (first similar region) which is occupied by blocks having the value of 1 in the image, and calculates the horizontal and vertical widths of the similar region.

In addition, the binarized similar region may be not only a region larger than the region of the template, but also a region which has the highest similarity in respect to the template within a same size as the region of the template among the regions in which the value of the similarity map is smaller than the predetermined threshold.

The calculator 38 calculates the relative position (positional relationship) of the template acquisition position within the binarized similar region and stores the relative position (positional relationship) in the RAM 24. This position will be referred to as an initial relative position.

For example, the calculator 38 calculates the relative position of the template acquisition position in a similar region 53a in FIG. 3A in terms of its horizontal and vertical proportional positions from left and top of the similar region 53a and stores the calculated values in the RAM 24. In FIG. 3A, since the relative position (positional relationship) of the template acquisition position is 25% from left and 50% from top, the calculator 38 stores the information of the initial relative position (positional relationship), which is 25% from left and 50% from top, in the RAM 24.

In addition, before calculating the relative position (positional relationship), the calculator 38 may perform the known image processing such as expansion and reduction on the binarized similarity map to remove noise regions and then calculate the relative position (positional relationship).

The second detector 39 reads initial image information (in the present embodiment, it uses the averages of the R, G, and B values in the respective blocks at the initial focus detection position) from the RAM 24 and calculates a similarity map similarly to the process performed by the first detector 37. Then, the second detector 39 calculates a binarized similarity map from the calculated similarity map and determines a similar region (second similar region).

The second detector 39 performs template matching on the tracking image information which is acquired repeatedly. After that, the second detector 39 calculates the horizontal and vertical widths of the similar region and outputs the calculated values to the position detector 40.

In addition, the similar region may be not only a region larger than the region of the template, but also a region which has the highest similarity in respect to the template within a same size as the region of the template among the regions in which the value of the similarity map is smaller than the predetermined threshold.

The position detector 40 reads the initial relative position (positional relationship) from the RAM 24 and applies the initial relative position (positional relationship) to the horizontal and vertical widths of the second similar region calculated by the second detector 39 to thereby determine the tracking position which is a stored absolute position.

Figure 3B:
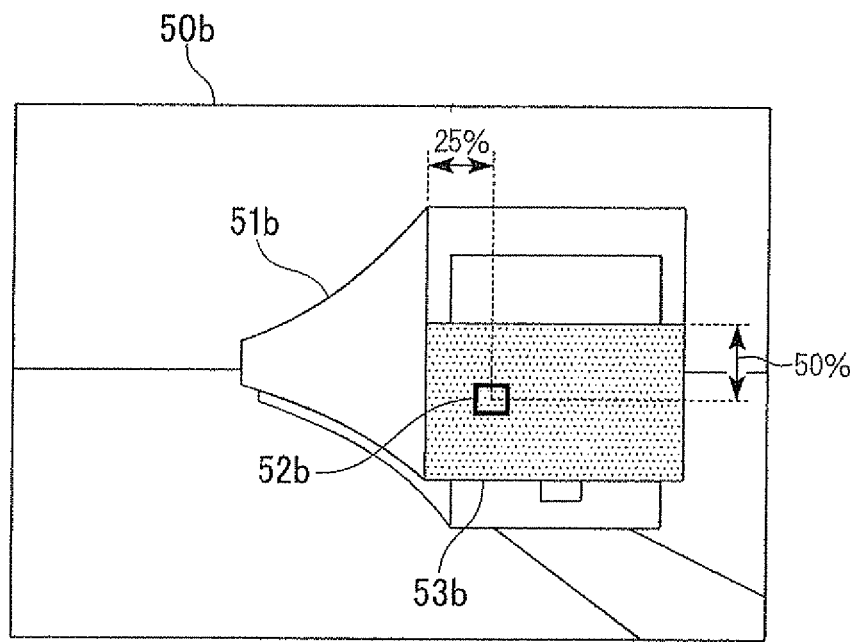

Specifically, for example, the initial relative position (positional relationship) which is 25% from left and 50% from top with respect to the horizontal and vertical width of the similar region 53b in FIG. 3B is displayed as a rectangular frame on the display unit 14 as the final tracking position.

The position detector 40 outputs the tracking position to the focus adjustment controller 32.

The A/D converter 41 converts the analog image signal input from the imaging device 18 into a digital signal and outputs the digital image signal to the image processor 42.

The image processor 42 performs image processing and stores image data in the RAM 24.

Respective control programs of the control unit 21 are stored in the ROM 25.

Figure 4:
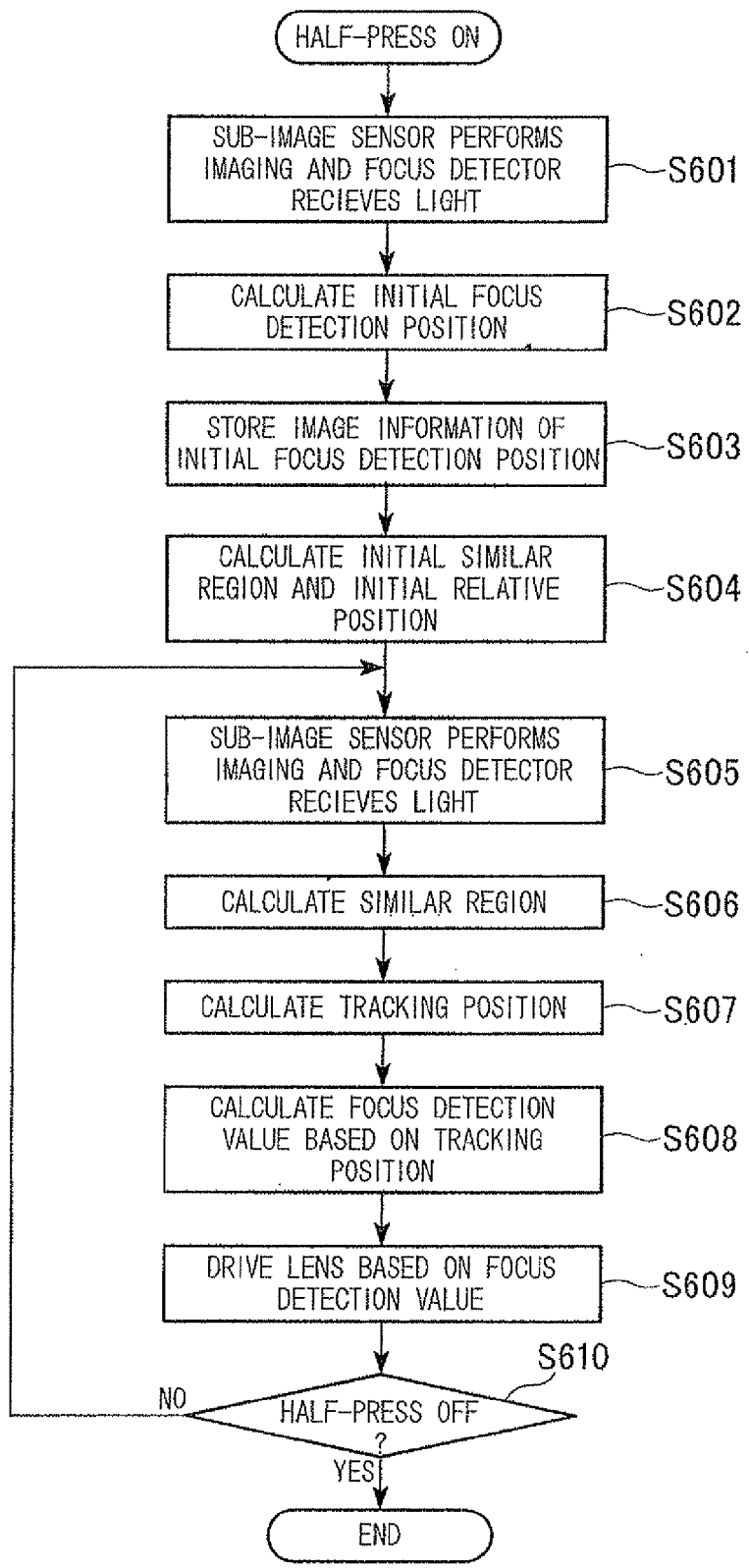
FIG. 4 is a flowchart illustrating the flow of a subject tracking process.

Next, the flow of a subject tracking process will be described with reference to the flowchart of FIG. 4. First, when a user half-presses a release button (shutter button), a sub-image sensor (imaging unit) 17 images a subject, and the focus detector 22 receives the subject beam (step S601). Subsequently, the extractor 36 calculates the initial focus detection position from the predetermined focus point (step S602). Subsequently, the extractor 36 stores the image information of the initial focus detection position in the RAM 24 (step S603), and the first detector 37 and the calculator 38 calculates the initial similar region and the initial relative position of the initial similar region, and stores the calculated information in the RAM 24 (step S604).

Subsequently, the sub-image sensor (imaging unit) 17 images a subject again and the focus detector 22 receives the subject beam (step S605). Subsequently, the second detector 39 (similar region calculator) reads the image information of the initial focus position from the RAM 24 as a template, performs the computation corresponding to template matching on the image information obtained presently to calculate a similar region, and calculates the horizontal and vertical widths of the similar region (step S606). Subsequently, the position detector 40 applies the initial relative position (positional relationship) read from the RAM 24 to the calculated horizontal and vertical widths, calculates a tracking position, displays the initial relative position on the display unit 14, and outputs the tracking position to the focus adjustment controller 32 (step S607). The focus adjustment controller 32 calculates a focus detection value (amount of defocus) with respect to the calculated tracking position and outputs the focus detection value to the focus adjustor 33 (step S608).

In this way, the user can keep track of an intended position of the train while preventing the tracking result from running unstably within the similar region which can occur when the computation according to the invention is not applied.

The focus adjustor 33 calculates a lens driving amount based on the calculated focus detection value, drives the lenses included in the photographic lens 1, and adjusts the distance between the lenses to thereby adjust the focusing (step S609). The processes of steps S605 to S609 are repeated (step S610: NO) until the half-press is released, and the process ends when the half-press is released (step S610: YES), Through the above process, even when a number of tracking position candidates having the same characteristics (color, luminance, or design) as the first target subject are present in the tracking screen, the imaging apparatus can keep track of the first focusing position as intended by the user while preventing the tracking position from being frequently changed between a plurality of candidates.

In addition, two or more binarized similar regions may be present on an image. In this case, the second detector 39 unifies the two or more binarized similar regions and the position detector 40 calculates the tracking position from the initial relative position (positional relationship) with respect to the horizontal and vertical widths of the unified similar region.

Figure 5:
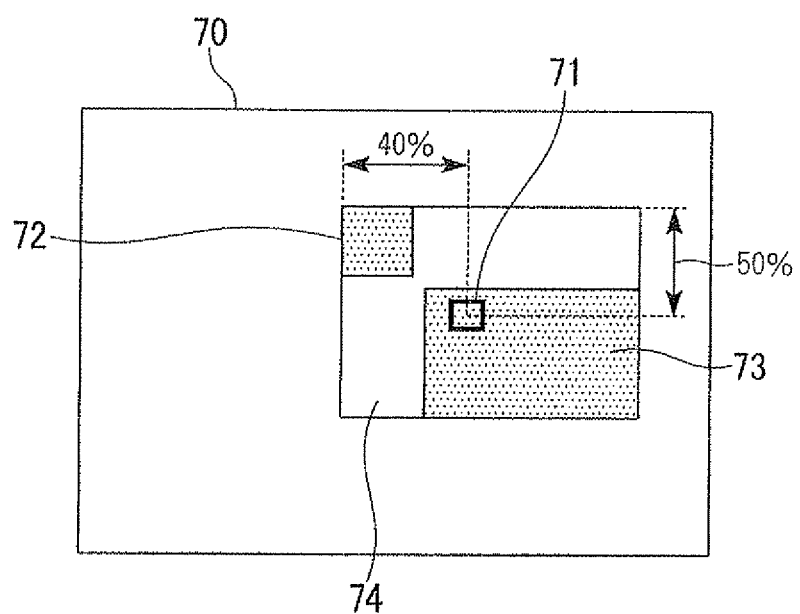
FIG. 5 is a diagram illustrating a method of calculating a tracking position when two similar regions are extracted.
Figure 6A:
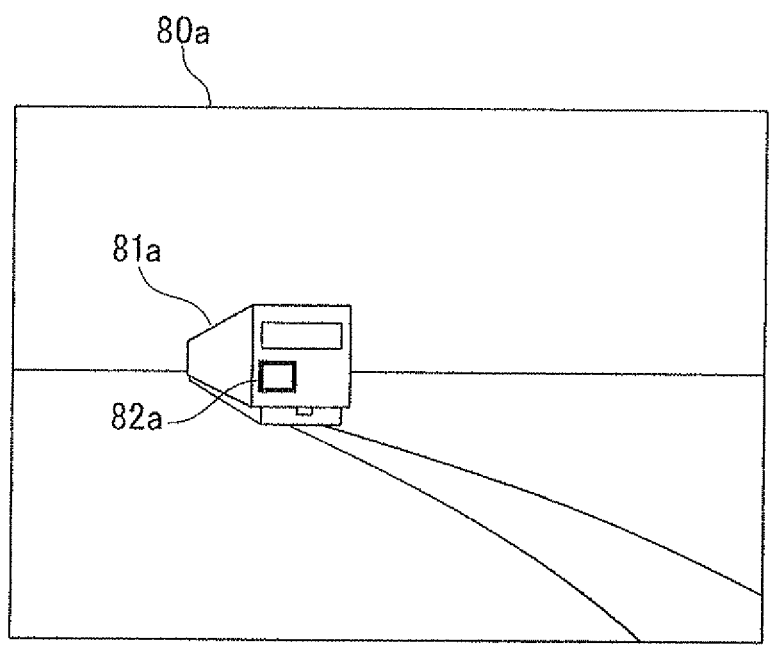
FIGS. 6A and 6B are diagrams illustrating a case in which one tracking position is not determined when a train is coming toward a viewer in the imaging apparatus of the related art.
Figure 6B:
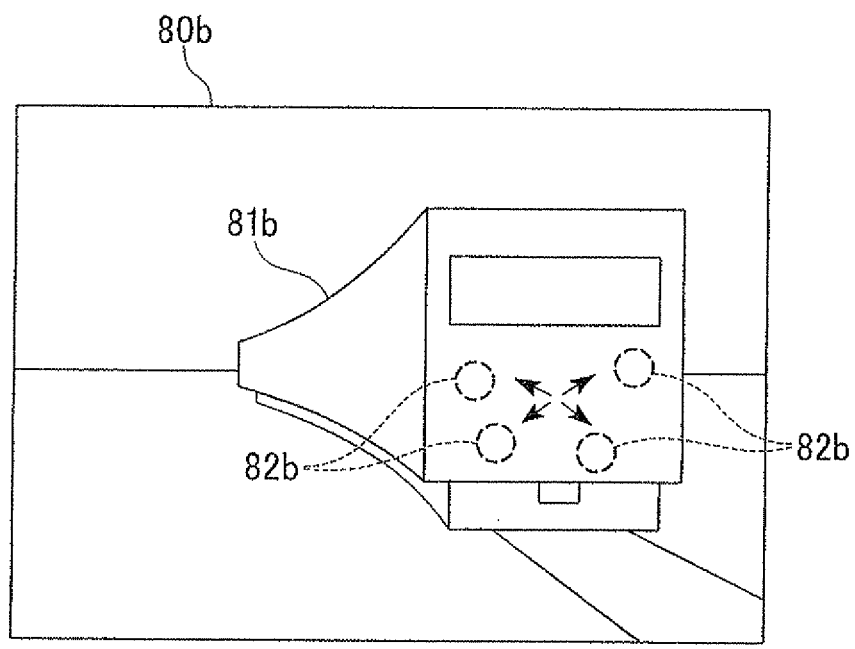
Figure 7:
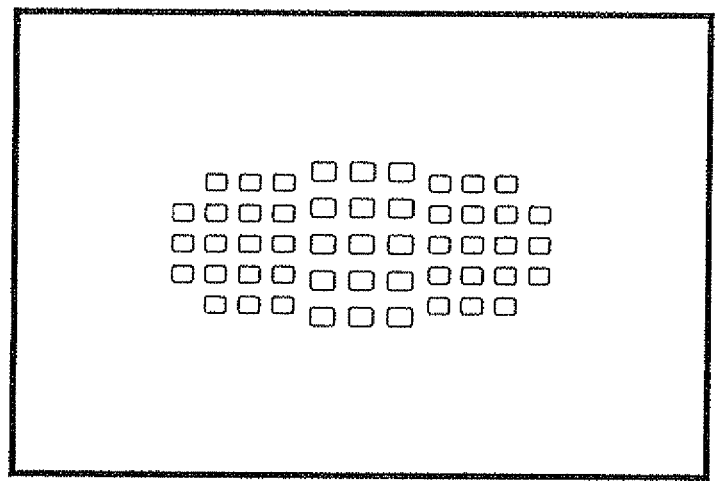
FIG. 7 is a diagram illustrating focus points displayed on a finder screen.

Specifically, for example, the second detector 39 sets a similar region 74 so as to include two similar regions 72 and 73 shown in FIG. 5 and outputs the similar region 74 to the position detector 40. Upon receiving the unified similar region 74 from the second detector 39, the position detector 40 applies the initial relative position (positional relationship) (40% from left and 50% from top) to the horizontal and vertical widths of the unified similar region 74 to calculate a tracking position 71 which is an absolute position.

The second detector 39 calculates the actual size of the initial similar region (first similar region) from an imaging magnification and calculates the actual size of a similar region (second similar region) which is calculated subsequently from an image magnification used subsequently. When the actual size of the second similar region is not within a predetermined range of magnification of the first similar region, the extraction of the second similar region may be regarded as an error. By doing so, even when an object having information similar to the image information of the initial focus detection position appears suddenly, it is possible to exclude an image region including the object from the tracking position based on the size of the similar region.

Moreover, the position detector 40 may update the template with the image information at the tracking position whenever the tracking position is calculated.

Furthermore, when the second similar region calculated by the second detector 39 includes a plurality of regions, the focus adjustment controller 32 may calculate the distances of each region and exclude the regions of which the distance is outside a predetermined range from the second similar region. In this way, regions which are erroneously extracted as the similar region can be excluded from the similar region based on the distance to the subject.

The focus adjustor 33 may stop adjusting the focusing of the optical system when the focus state (defocus amount) detected repeatedly by the focus adjustment controller 32 lacks continuity. Specifically, the focus adjustor 33 controls the lens driver 3 so as to temporarily halt the movement of lenses. In this way, even when an object having information similar to the image information of the initial focus detection position appears suddenly, it is possible to exclude the object from the tracking position based on the distance to the object.

In the present embodiment, although the tracking position is displayed on the finder screen (the display unit 14) in the case of the digital single-lens reflex camera, the tracking position may be displayed on the back liquid-crystal display of a camera in the case of a compact digital camera.

While the embodiment of the invention has been described with reference to the drawings, the specific configuration is not limited to the embodiment, and various modifications can be made without departing from the spirit of the invention.

What is claimed is:

1. An imaging apparatus comprising:
an imaging unit comprising a sensor that captures a first image and captures a second image;
a focus adjustor that sets a first focus area; and
a detector that acquires a first image area from the first image and acquires a second image area from the second image, an image at the first image area being similar to an image at the first focus area of the first image, and an image at the second image area being similar to the image at the first focus area of the first image,
wherein the detector acquires a relative position of the first focus area in the first image area and acquires a position of a second focus area in the second image area by using the relative position of the first focus area in the first image area.

2. The imaging apparatus according to claim 1,
wherein a size of the first image area and a size of the second image area are each larger than a size of the image at the first focus area of the first image.

3. The imaging apparatus according to claim 1,
wherein the focus adjustor sets the image at the first focus area of the first image as a template image, and the detector acquires the first image area and the second image area with a template matching by using the template image.

4. The imaging apparatus according to claim 1,
wherein the focus adjustor sets the second focus area so that a first positional relationship and a second positional relationship are substantially equal to each other, the first positional relationship representing a positional relationship of the first image area and the first focus area, the second positional relationship representing a positional relationship of the second image area and the second focus area.

5. The imaging apparatus according to claim 1,
wherein the focus adjustor calculates a length from at least one of an upper end and a lower end of the second image area to the second focus area by using a length from at least one of an upper end and a lower end of the first image area to the first focus area.

6. The imaging apparatus according to claim 5,
wherein the third detector determines a region which is similar to an image of the first tracking position in the first image as the second two-dimensional region in the second image.

7. The imaging apparatus according to claim 5,
wherein the focus adjustor calculates a length from at least one of a left end and a right end of the second image area to the second focus area by using a length from at least one of a left end and a right end of the first image area to the first focus area.

8. An imaging apparatus comprising:
an focus adjustor that adjusts a focus with respect to at least one of a first tracking position in a first image and a second tracking position in a second image, the first image being output from an imaging unit, comprising a sensor;
a first detector that detects a first image area from the first image and determine the first image area as a first two-dimensional region which includes the first tracking position in the first image, an image at the first image area being similar to an image at the first tracking position in the first image;
a second detector that determines a relative relationship of the first tracking position in the first two-dimensional region, in the first image;

a third detector that detects a second image area from the second image and determine the second image area as a second two-dimensional region which corresponds to the first two-dimensional region, in the second image, an image at the second image area being similar to an image at the first tracking position in the first image; and a fourth detector that determines the second tracking position in the second two-dimensional region by using the determined relative relationship of the first tracking position in the first two-dimensional region.

9. The imaging apparatus according to claim 8, wherein the second two-dimensional region has a two-dimensional shape which is substantially similar to that of the first two-dimensional region.

10. The imaging apparatus according to claim 8, wherein the tracking positions of the first and second images, the first two dimensional region and the second two-dimensional region have similar image information with each other.

11. The imaging apparatus according to claim 8, wherein, when the first two-dimensional region is determined, the first detector uses a similarity map about an image similarity for the first image, the image similarity being provided between in the first two-dimensional region and at the tracking position.

12. The imaging apparatus according to claim 11, wherein the second two-dimensional region is determined based on the similarity map of the first image and a similarity map about the image similarity for the second image.

13. The imaging apparatus according to claim 8, further comprising:
a memory that stores image information at the tracking position in the first image and the second image.

14. The imaging apparatus according to claim 8, further comprising:
a display that shows the tracking position in the image while displaying the image obtained from the imaging unit.

15. An imaging apparatus comprising:
an imaging unit comprising a sensor;
a first detector that acquires an image at a first position of a first image as a reference image, the first image being captured by the imaging unit;
a second detector that detects a first image area from the first image and acquire the first image area as a first similar image, the first similar image having a characteristic similar to a characteristic of the reference image and having a larger area compared to all area of the reference image;
a third detector that acquires relative positions of the reference image in the first similar image;
a fourth detects that detects a second image area from a second image and acquires the second image area as a second similar image, the second image being imaged by the imaging unit later than the first image was imaged, the second similar image having a characteristic similar to the characteristic of the reference image and having a larger area compared to the area of the reference image;
a fifth detector that acquires a second position in the second image by using the relative positions of the reference image in the first similar image; and
a focus controller that performs a focus control regarding the first position after the acquisition of the first image and a focus control regarding a second position after the acquisition of the second image.

16. The imaging apparatus according to claim 15, wherein the second detector acquires an image range having the characteristic from within the first image as the first similar image.

17. The imaging apparatus according to claim 16, wherein when a ratio of a size of the second similar image calculated by an imaging magnification which was obtained when the second image was imaged and a size of the first similar image calculated by an imaging magnification which was obtained when the first image was imaged does not fall within a predetermined range, the fifth detector inhibits detecting the position of an image corresponding to the relative position from the second similar image.

18. The imaging apparatus according to claim 15, wherein the fifth detector updates the reference image based on an image of the corresponding part when the position of the corresponding part is detected.

19. The imaging apparatus according to claim 15, further comprising:
an optical system; and
a focus detector that detects a focus state of the optical system according to a position of the second similar image,
wherein, when a plurality of focus states is detected for the second similar images, the fourth detector excludes the second similar image corresponding to the focus state having no similarity among the plurality of focus states.

20. The imaging apparatus according to claim 19, further comprising:
a focus adjustment controller that repeatedly detects the focus state using the focus detector; and
a focus adjustor that adjusts the focusing of the optical system,
wherein the focus adjustor stops adjusting the focusing of the optical system when the focus state detected repeatedly lacks continuity.

21. The imaging apparatus according to claim 15, further comprising:
a display unit that displays the position detected by the fifth detector as a tracking position.

22. An imaging apparatus comprising:
an imaging unit comprising a sensor that captures a first image and captures a second image;
a focus adjustor that sets a first focus area; and
a controller that acquires a first image area from the first image and acquires a second image area from the second image, an image at the first image area of the first image being similar to an image at the first focus area of the first image, and an image at the second image area of the second image being similar to the image at the first focus area of the first image or the image at the first image area of the first image,
wherein the controller gets a relative position of the first focus area in the first image area and gets a position of a second focus area in the second image area by using the relative position of the first focus area in the first image area.

23. The imaging apparatus according to claim 22, wherein the first image area is similar in color to the second image area.

24. The imaging apparatus according to claim 22, wherein the first image area is similar in luminance to the second image area.

25. The imaging apparatus according to claim 22, wherein the first image area is similar in design to the second image area.

26. The imaging apparatus according to claim 22,
wherein the controller acquires the first image area from the first image and acquires the second image area from the second image by using color information.

27. The imaging apparatus according to claim 22,
wherein the controller acquires the first image area from the first image and acquires the second image area from the second image by using luminance information.

28. The imaging apparatus according to claim 22,
wherein the controller acquires the first image area from the first image and acquires the second image area from the second image by using design information.

29. The imaging apparatus according to claim 22, further comprising:
a display unit that displays the first focus area and the second focus area.

30. The imaging apparatus according to claim 22, wherein the controller controls focusing of an optical system.

31. The imaging apparatus according to claim 22,
wherein the controller controls focusing of an optical system by using the first focus area and the second focus area.

32. The imaging apparatus according to claim 22,
wherein a size of the first image area and a size of the second image area is larger than a size of the first focus area.

33. The imaging apparatus according to claim 22, wherein a size of the second image area is larger than a size of the first image area.

* * * * *